No. 673,438. Patented May 7, 1901.
W. A. LIVINGSTON.
STOVE.
(Application filed June 2, 1900.)
(No Model.) 3 Sheets—Sheet 1.

Fig. I.

Witnesses
Howard D. Orr
J. W. Garner

W. A. Livingston, Inventor,
by C. A. Snow & Co.
Attorneys

No. 673,438. Patented May 7, 1901.
W. A. LIVINGSTON.
STOVE.
(Application filed June 2, 1900.)
(No Model.) 3 Sheets—Sheet 2.

Witnesses
Howard D. Orr.
J. W. Garner

W. A. Livingston, Inventor
by C. A. Snow & Co.
Attorneys

THE NORRIS PETERS CO., PHOTO-LITHO., WASHINGTON, D. C.

No. 673,438. Patented May 7, 1901.
W. A. LIVINGSTON.
STOVE.
(Application filed June 2, 1900.)
(No Model.) 3 Sheets—Sheet 3.

Witnesses
Howard D. Orr.
J. W. Garner

W. A. Livingston, Inventor,
by C. A. Snow & Co.
Attorneys

UNITED STATES PATENT OFFICE.

WILLIAM A. LIVINGSTON, OF PALATKA, FLORIDA.

STOVE.

SPECIFICATION forming part of Letters Patent No. 673,438, dated May 7, 1901.

Application filed June 2, 1900. Serial No. 18,835. (No model.)

*To all whom it may concern:*

Be it known that I, WILLIAM A. LIVINGSTON, a citizen of the United States, residing at Palatka, in the county of Putnam and State of Florida, have invented a new and useful Stove, of which the following is a specification.

My invention is an improvement in stoves, more particularly to the fireback, oven-plate, damper, and bridge-plate thereof, the object of my invention being to provide an adjustable fireback, oven-plate, damper, and bridge-plate which may be varied in size and adapted thereby to fit stoves of varying sizes.

My invention consists in the peculiar construction and combination of devices hereinafter fully set forth, and pointed out in the claims.

Figure 1:
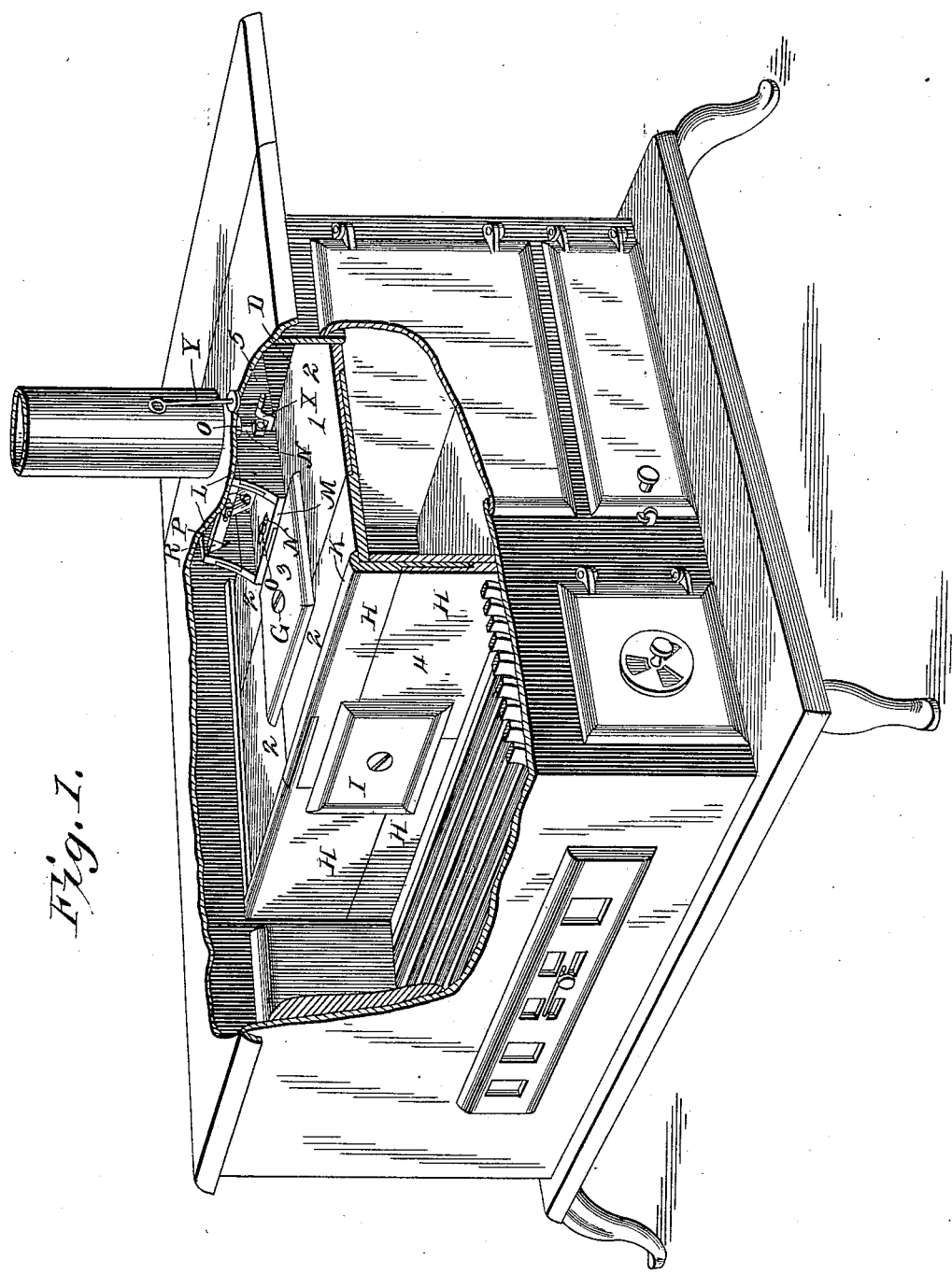
Figure 2:
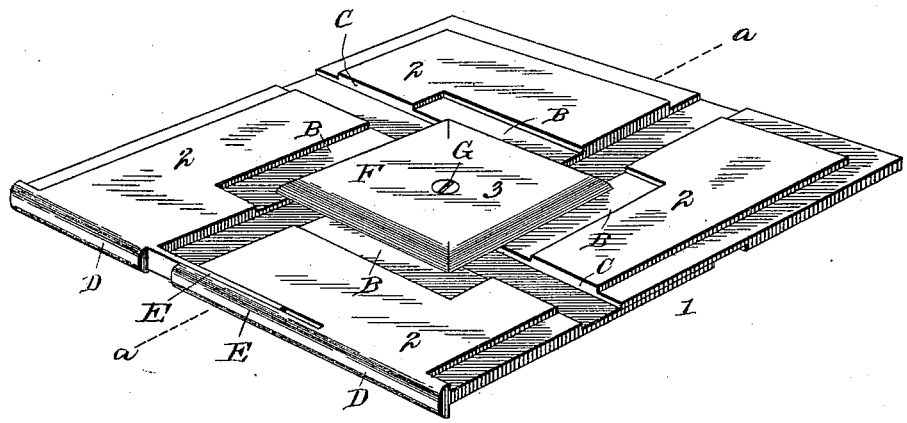
Figure 3:
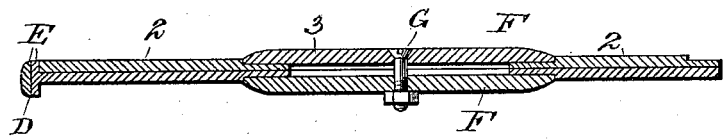
Figure 4:
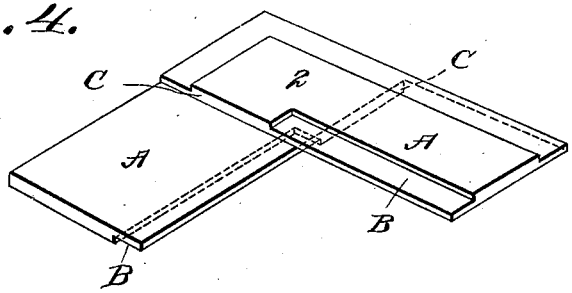
Figure 5:
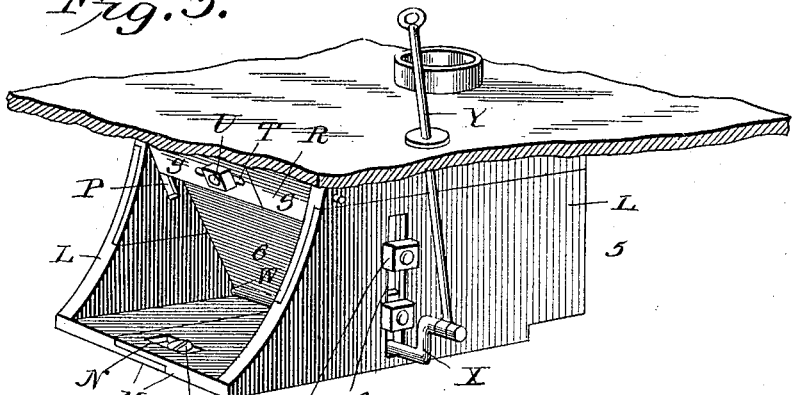
Figure 6:
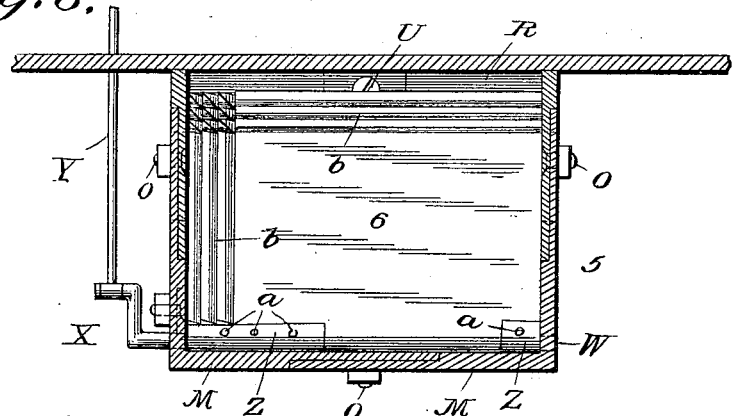
Figures 7, 8, 9:
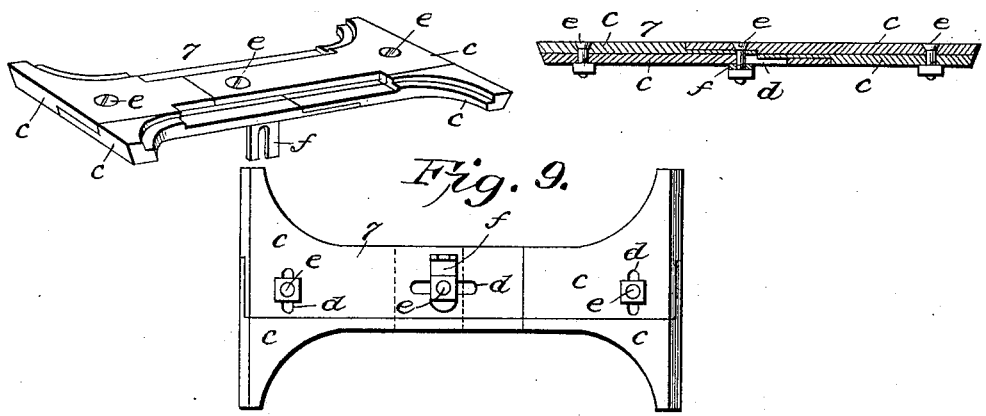

In the accompanying drawings, Figure 1 is a sectional perspective view of a cooking-stove provided with a fireback, oven-plate, and damper constructed in accordance with my invention. Fig. 2 is a detail perpective view of an oven-plate constructed in accordance with my invention. Fig. 3 is a sectional view of the same, taken on the line $a$ $a$ of Fig. 2. Fig. 4 is a detail perspective view of one of the corner-sections of my improved oven-plate. Fig. 5 is a detail perspective view of my improved damper and damper-box. Fig. 6 is a detail transverse sectional view of the same, looking from the rear side thereof. Fig. 7 is a detail perspective view of my improved adjustable bridge-plate. Fig. 8 is a detail sectional view of the same. Fig. 9 is a detail inverted plan view of the same.

In the embodiment of my invention I provide an adjustable oven-plate 1, which is adapted to be varied in size to enable the same to fit stoves of varying sizes. The said oven-plate is composed of four corner-sections 2 and a central binding-section 3. Each of the corner-sections is composed of the arms A, which extend at right angles from each other and have rabbets B on their inner sides on their respective upper and lower surfaces. The arms A are on different planes, thereby forming right-angled offsets or shoulders C in line with their respective inner sides, and said offsets or shoulders C and said rabbets B enable the said corner-sections 2 to be combined together and to bear upon each other, so that their respective upper and lower surfaces when thus combined are flush, and the said arms A of the said respective corner-sections when the latter are combined, as shown in Figs. 1 and 2, overlap and admit of the said corner-sections being drawn outward in opposite directions to increase the superficial areas of the oven-plate and correspondingly enlarge the same and to be moved inward toward each other in order to contract the oven-plate and lessen the size thereof, thus adapting the oven-plate to be used in a stove of any size.

Two of the corner-sections are provided on one side with a depending flange D. The said flanges D of the said corner-sections are provided with overlapping members E, and the said flanges adapt the said oven-plate to fit over the rear side of the oven.

The central section 3 of the oven-plate is square, as shown, and comprises a pair of plates F, disposed one above the other and connected together by a centrally-disposed stove-bolt G, the said plates F being clamped upon the upper and lower sides of the respective rabbets B of the corner-sections 2, the said stove-bolt G being loosened when the corner-plates are adjusted to vary the size of the oven-plate, as hereinbefore described, and being tightened when adjustment has been effected in order to clamp the rabbets B firmly between the plates F of the central section, and thereby secure the oven-plate at the required adjustment.

The fireback 4 is substantially identical in construction with the oven-plate 1, H being the corner-sections thereof and I being the central clamping-section. The said fireback is provided at its upper side with a rearward-extending flange K, formed on the upper corner-section, which flange overlaps and bears upon the front upper side of the oven-plate 1. This construction of the fireback adapts the same to be varied in size and to be used in a stove of any usual size, as will be understood.

The box or casing 5 has overlapping adjustable sides L and overlapping adjustable bottom sections M. The said overlapping side and bottom sections have registering coacting adjusting-slots N, in which are adjusting-bolts O, which serve to clamp the said sections together when the box or casing has been adjusted to any required size. In the sides of the box or casing, near the upper front corners thereof, are inclined adjusting-recesses P, in which are fitted the ends of an adjustable extensible stop-plate R, which is composed of overlapping sections S, having registering adjusting-slots T and a clamping-bolt U, by means of which the length of the said plate R may be varied to correspond with the width of the box or case 5. The damper 6, which is hinged or pivoted at its lower side in the sides of the box or case 5, as at W, swings against the stop-plate R when the damper is closed in the box or case and is provided with the usual crank X and operating-rod Y, whereby it may be adjusted as required. The said damper is provided with pivotal sections Z, which overlap corresponding parts of the damper and are secured thereto, as at $a$. The damper is initially of the largest size required for the largest-size stove, and the same on two of its edges is provided or cast with a series of break kerfs or grooves $b$, which enable the size of the damper to be diminished in order to fit the same for use in a stove of less than the largest size by breaking off two of the sides of the damper upon appropriate kerfs or grooves $b$. Hence not only is the damper box or case variable in size, but the damper is also variable in size correspondingly.

The bridge-plate 7 is adjustable in size both longitudinally and laterally, being composed of four overlapping sections $c$, having appropriate rabbets and offsets, whereby their respective upper and lower surfaces are flush when said sections are assembled together, and said sections are provided with appropriate adjusting-slots $d$ and openings for bolts $e$, which serve to clamp the sections of the bridge-plate firmly together when the same has been adjusted. Disposed under the center of the bridge-plate and secured on the central clamping-bolt $e$ thereof is a right-angled supporting-bracket $f$, which sustains the central portion of the bridge-plate and strengthens the same at that point, thereby preventing the bridge-plate from sagging when in use.

The utility of my improvements hereinbefore described will be apparent. The same enable a stove to have the fireback, oven-plate, bridge-plate, or damper thereof renewed when the same becomes worn or burned out, and the said parts when constructed in accordance with my invention are adapted to fit and be used in a stove of any of the sizes commonly manufactured. Hence in small towns, isolated country places, and other sections remote from commercial and manufacturing centers the worn or burned-out parts of the stove, of whatever size or make it may be, may be replaced from a common stock of the parts constructed in accordance with my invention at slight cost and without the annoyance and inconvenience occasioned by the delay involved in ordering such parts from a distant point.

Having thus described my invention, I claim—

1. An adjustable member, as a fireback or the like, comprising the corner-sections having the arms disposed at right angles on different planes thereby forming offsets or shoulders in line with their respective inner sides and having rabbets on their inner sides on their respective upper and lower surfaces, the respective arms of said corner-sections overlapping each other, and the central section comprising a pair of plates on opposite sides of the corner-sections and in the respective rabbets thereof and means to clamp said plates onto said rabbets of said corner-sections, substantially as described.

2. An adjustable member, as a fireback or the like, comprising the corner-sections having the arms disposed at right angles on different planes thereby forming offsets or shoulders in line with their respective inner sides and having rabbets on their inner sides on their respective upper and lower surfaces, the respective arms of said corner-sections overlapping each other, and the central section comprising a pair of plates on opposite sides of the corner-sections and in the respective rabbets thereof and a clamping-bolt connecting said plates and adapted to clamp the same onto said rabbets of said corner-sections when the latter are adjusted, substantially as described.

In testimony that I claim the foregoing as my own I have hereto affixed my signature in the presence of two witnesses.

WILLIAM A. LIVINGSTON.

Witnesses:
JOSEPH PRICE,
HEINS PETERMANN.